United States Patent
Levy et al.

(10) Patent No.: US 8,681,248 B1
(45) Date of Patent: Mar. 25, 2014

(54) SMART TRIGGER LOGIC FOR FOCAL PLANE ARRAYS

(75) Inventors: James E. Levy, Albuquerque, NM (US); David V. Campbell, Tijeras, NM (US); Michael L. Holmes, Albuquerque, NM (US); Robert Lovejoy, Albuquerque, NM (US); Kenneth Wojciechowski, Albuquerque, NM (US); Randolph R. Kay, Alburquerque, NM (US); William S. Cavanaugh, Albuquerque, NM (US); Thomas M. Gurrieri, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 196 days.

(21) Appl. No.: 13/323,459

(22) Filed: Dec. 12, 2011

(51) Int. Cl.
*H04N 5/217* (2011.01)
(52) U.S. Cl.
USPC ........... 348/241; 348/242; 348/243; 348/246; 348/247
(58) Field of Classification Search
USPC .......................... 348/241, 242, 243, 246, 247
See application file for complete search history.

(56) References Cited

U.S. PATENT DOCUMENTS

2002/0005904 A1* 1/2002 Mendis .................. 348/246

* cited by examiner

*Primary Examiner* — Yogesh Aggarwal
(74) *Attorney, Agent, or Firm* — Martin I. Finston

(57) ABSTRACT

An electronic device includes a memory configured to receive data representing light intensity values from pixels in a focal plane array and a processor that analyzes the received data to determine which light values correspond to triggered pixels, where the triggered pixels are those pixels that meet a predefined set of criteria, and determines, for each triggered pixel, a set of neighbor pixels for which light intensity values are to be stored. The electronic device also includes a buffer that temporarily stores light intensity values for at least one previously processed row of pixels, so that when a triggered pixel is identified in a current row, light intensity values for the neighbor pixels in the previously processed row and for the triggered pixel are persistently stored, as well as a data transmitter that transmits the persistently stored light intensity values for the triggered and neighbor pixels to a data receiver.

20 Claims, 5 Drawing Sheets

SMART TRIGGER LOGIC FOR FOCAL PLANE ARRAYS

STATEMENT REGARDING GOVERNMENT RESEARCH AND DEVELOPMENT

This invention was made with Government support under government contract no. DE-AC04-94AL85000 awarded by the U.S. Department of Energy to Sandia Corporation. The Government has certain rights in the invention, including a paid-up license and the right, in limited circumstances, to require the owner of any patent issuing in this invention to license others on reasonable terms.

BACKGROUND

Charge-coupled devices (CCDs) and other photoelectric image sensors are often used to capture image data. These sensors are typically manufactured with grid of light-sensing pixels. The grid may include anywhere from tens of pixels to millions of pixels. The image sensors are typically placed inside a camera or other imaging device. In the camera, the image sensors are exposed to light waves for a predefined amount of time using a shudder. Once exposed to light, each pixel in the image sensor detects a light intensity value. This value is scanned for each pixel, and stored in an image file.

In some cases, CCDs or other image sensors may be used in video applications where the sensor is continuously exposed to light. In such cases, the pixels of the sensor are scanned in a periodic manner, where each scan creates a frame in the video. The data from each scan is passed to memory and then on to a processor for downstream analysis and image generation. In some cases, image sensor scans may be performed at a relatively high rate, generating hundreds or thousands of frames each second. The large amount of data generated by these frequent scans may be difficult to process and/or transmit in situations where processing or transmission bandwidths are limited.

BRIEF SUMMARY

Embodiments described herein are directed to devices, methods and systems for efficiently collecting and transmitting focal plane array data. In one embodiment, an electronic device includes the following: a memory configured to receive data representing light intensity values from pixels in a focal plane array and a processor configured to perform the following: analyze the received data to determine which light values correspond to triggered pixels, where the triggered pixels are those pixels that meet a predefined set of criteria, and determine, for each triggered pixel, a set of neighbor pixels for which light intensity values are to be stored. The electronic device also includes a buffer that temporarily stores light intensity values for at least one previously processed row of pixels, so that when a triggered pixel is identified in a current row, light intensity values for the neighbor pixels in the previously processed row and for the triggered pixel are persistently stored, and a data transmitter that transmits the persistently stored light intensity values for the triggered and neighbor pixels to a data receiver.

In another embodiment, a computer system receives data representing light intensity values from multiple different pixels in a focal plane array. The data is received in a sequential fashion as the focal plane array pixels are scanned. The computer system analyzes the received data to determine which light values correspond to triggered pixels and further determines, for each triggered pixel, a set of neighbor pixels for which light intensity values are to be stored. The computer system temporarily stores light intensity values for at least one previously processed row of pixels. Then, when a triggered pixel is identified in a current row, light intensity values for the neighbor pixels in the previously processed row and for the triggered pixel are persistently stored. The computer system also transmits the persistently stored light intensity values for the triggered and neighbor pixels to a data receiver.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments of the invention may be realized and obtained by means of the instruments and combinations particularly pointed out in the appended claims. Features of the embodiments of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The embodiments of the invention will be described and explained with additional specificity and detail through the use of the accompanying drawings in which.

DETAILED DESCRIPTION

Figure 1:
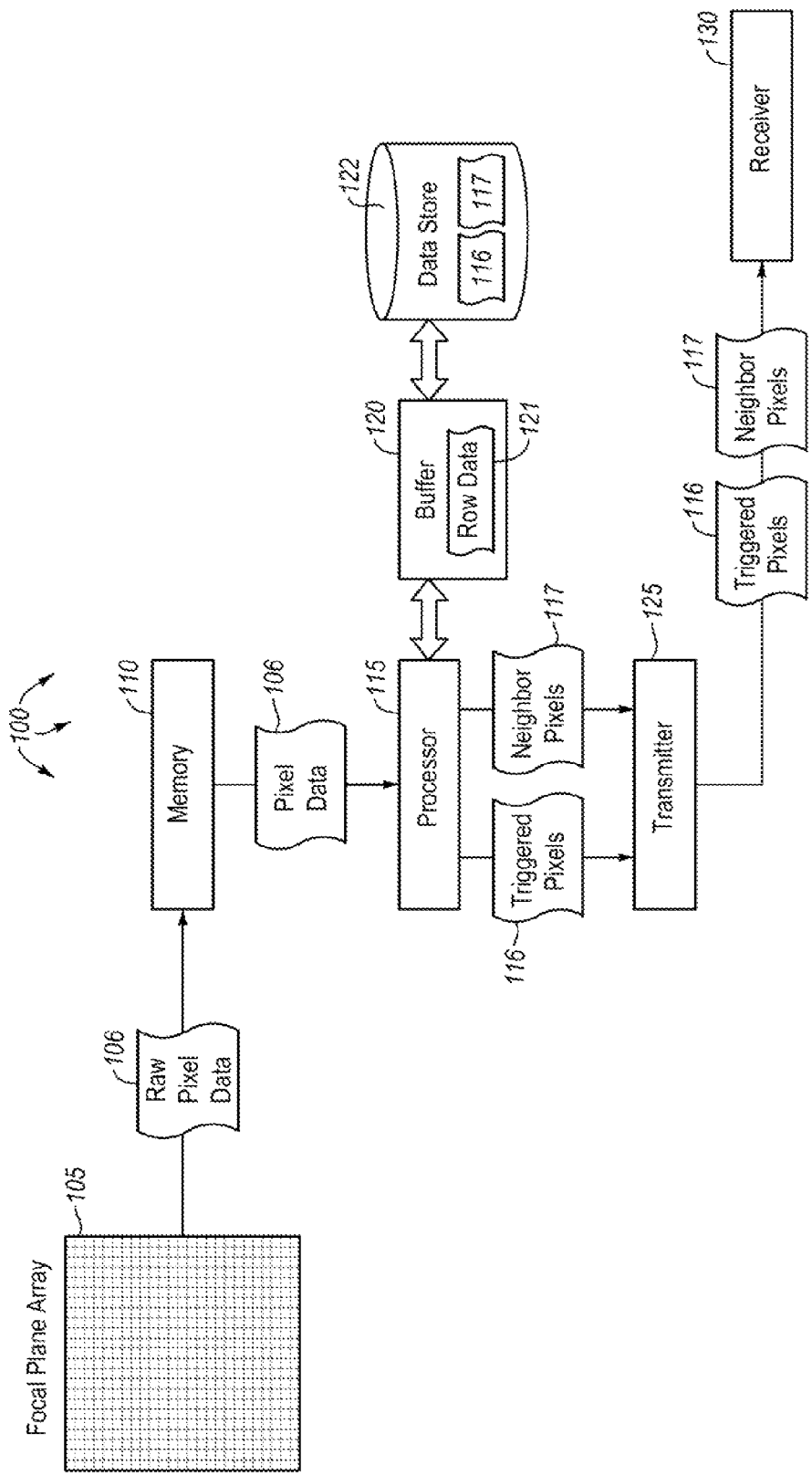
FIG. 1 illustrates an electronic device architecture in which embodiments of the present invention may operate including efficiently collecting and transmitting focal plane array data.

Embodiments described herein are directed to devices, methods and systems for efficiently collecting and transmitting focal plane array data. In one embodiment, an electronic device includes the following: a memory configured to receive data representing light intensity values from pixels in a focal plane array and a processor configured to perform the following: analyze the received data to determine which light values correspond to triggered pixels, where the triggered pixels are those pixels that meet a predefined set of criteria, and determine, for each triggered pixel, a set of neighbor pixels for which light intensity values are to be stored. The electronic device also includes a buffer that temporarily stores light intensity values for at least one previously processed row of pixels, so that when a triggered pixel is identified in a current row, light intensity values for the neighbor pixels in the previously processed row and for the triggered pixel are persistently stored, and a data transmitter that transmits the persistently stored light intensity values for the triggered and neighbor pixels to a data receiver.

In another embodiment, a computer system receives data representing light intensity values from multiple different pixels in a focal plane array. The data is received in a sequential fashion as the focal plane array pixels are scanned. The computer system analyzes the received data to determine which light values correspond to triggered pixels and further determines, for each triggered pixel, a set of neighbor pixels for which light intensity values are to be stored. The computer system temporarily stores light intensity values for at least one previously processed row of pixels. Then, when a triggered pixel is identified in a current row, light intensity values for the neighbor pixels in the previously processed row and for the triggered pixel are persistently stored. The computer system also transmits the persistently stored light intensity values for the triggered and neighbor pixels to a data receiver.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmissions media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

FIG. 1 illustrates an electronic device architecture 100 in which the embodiments of the present invention may be employed. Architecture 100 includes focal plane array 105. As used herein, the term "focal plane array" may include any type of photoelectric image sensor, including charge coupled devices (CCDs) and other devices. The focal plane array may include one chip or many different chips. The chips may be placed immediately adjacent one another, or may be spaced out according to various design implementations.

The focal plane array may include substantially any number of pixels, on substantially any number of different photoelectric chips, in various sizes, shapes and arrangements. Although the array of FIG. 1 is shown as a square with square pixels, it will be understood that the array may include various differently-shaped pixels, arranged in other, non-square shapes. It should also be noted that the pixels in the focal plane array may be arranged in various different manners including as a one-dimensional array of pixels (e.g. a row), as a two-dimensional array of pixels (e.g. a grid) and/or as a three-dimensional array of pixels (e.g. a cubical array of grids).

As mentioned above, the focal plane array is configured to convert light intensity values into digital pixel data. When exposed to electromagnetic waves (whether visible light, or any of a number of different types of electromagnetic waves), the photosensitive pixels detect a certain amount of light at each pixel. That value is recorded for each pixel in a scan. A completed scan includes data for each pixel in the focal plane array. This completed scan may be stored as a frame. Many different compression schemes exist for reducing the stored size of the frame, and, as this is not the focus of the invention as claimed, these will not be discussed here.

Thus, the focal plane array sends light intensity values from each pixel to the device's memory 110. This raw pixel data 106 may be temporarily stored in the memory and then passed to the processor 115 for processing. The processor may take the received raw pixel data and begin to analyze it to determine which data values will be retained and which will be discarded. To minimize the amount of data transmitted by the transmitter 125 to the receiver 130, the processor may analyze the raw pixel data to determine which pixels' data would be most beneficial to transfer. That is, it may determine that some pixels' data is more interesting, or better fits a certain set of criteria, and is thus more important to transfer.

Figure 2:
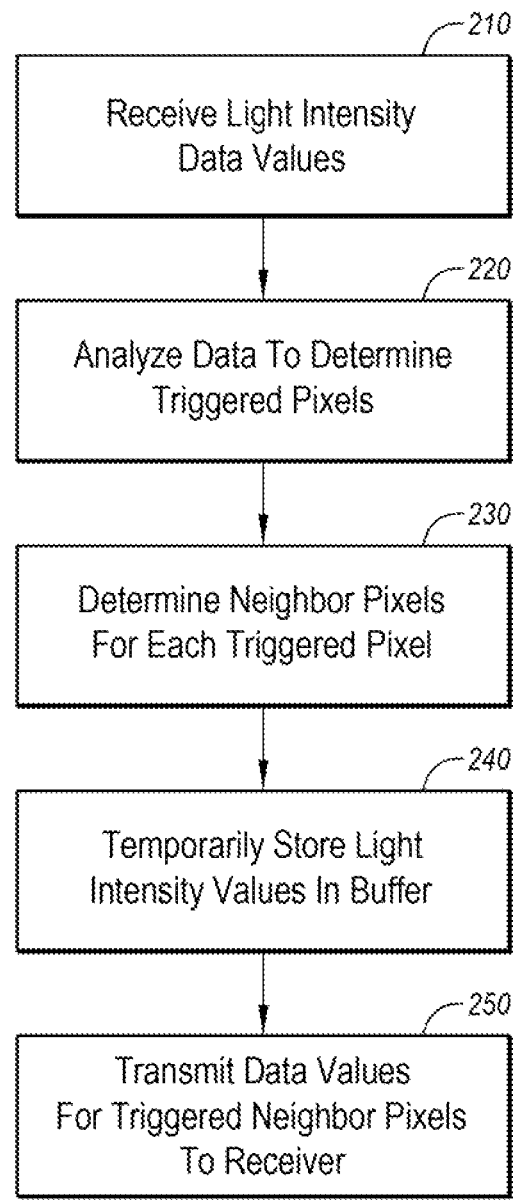
FIG. 2 illustrates a flowchart of an example method for efficiently collecting and transmitting focal plane array data.
Figure 3:
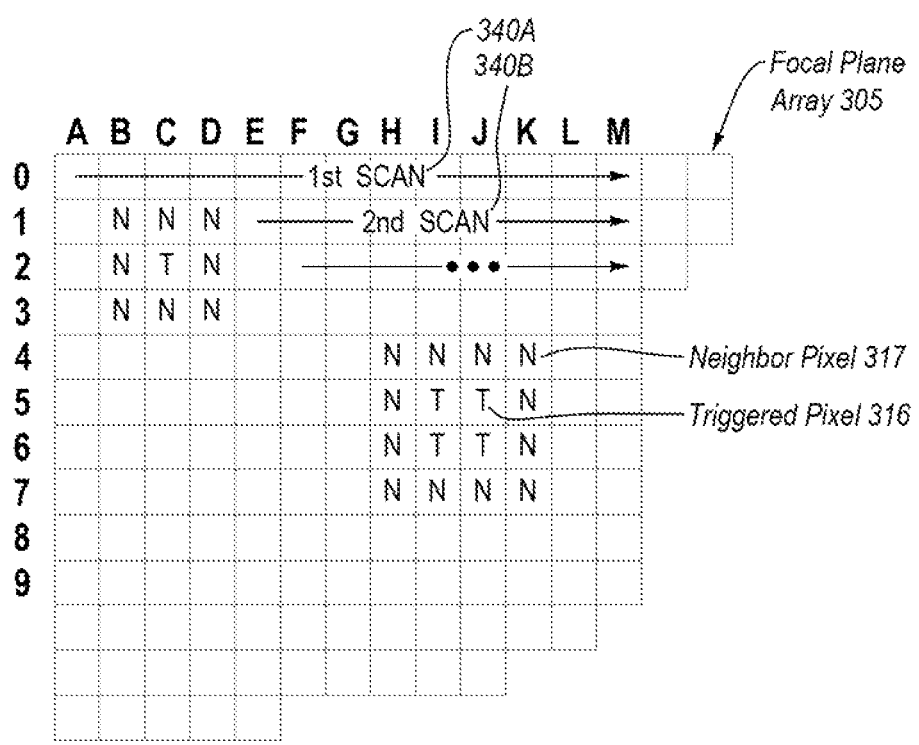
FIG. 3 illustrates an example focal plane array.
Figure 4A:
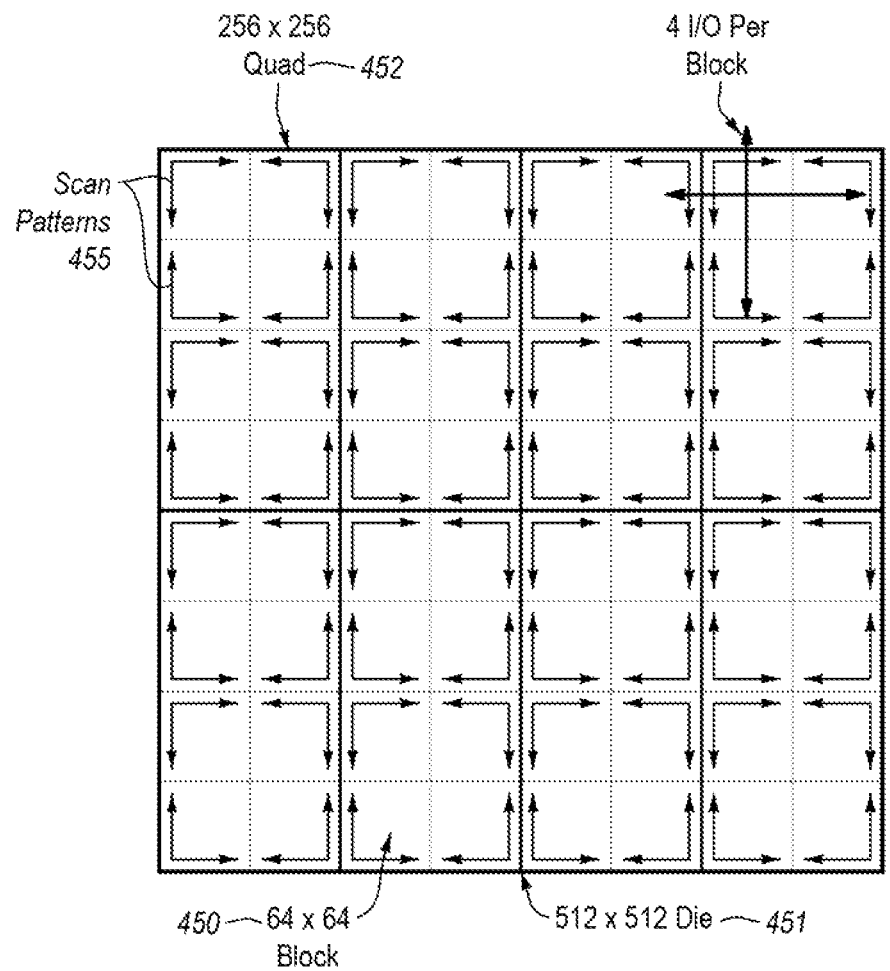
FIG. 4A illustrates an example multi-chip focal plane array with differently arranged scan patterns.
Figure 4B:
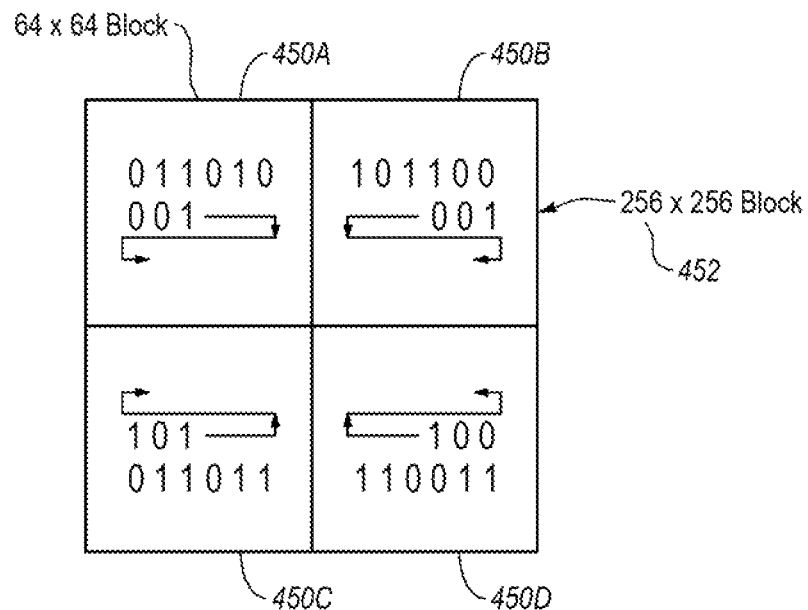
FIG. 4B illustrates data and scanning pattern embodiments in a multi-chip focal plane array.
Figure 4C:
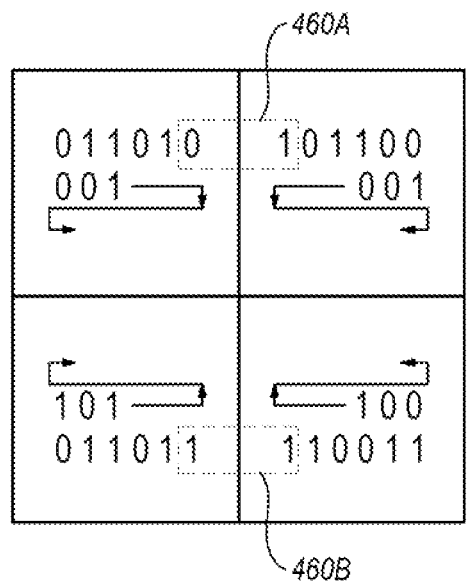
FIG. 4C illustrates edge data comparing embodiments in a multi-chip focal plane array.

For example, a device user may determine that the overall light intensity value is what is most important to them. Thus, pixels having at least a threshold light intensity value will be flagged by the processor as triggered pixels 116. As used herein, the term "triggered pixel" may refer to any pixel that has met a predetermined set of criteria. In this case, the criteria included having a threshold light intensity value. Any pixel in the focal plane array that has at least the predetermined threshold light intensity value would be flagged as a triggered pixel and would be stored as such in data store 122. In other cases, the criteria may include a threshold amount of increase or decrease in light intensity value from one scan to the next. In such cases, if a given pixel's light intensity value changes a certain amount (positively or negatively), the pixel will be identified as a triggered pixel. Many other criteria are possible, and may be customized or changed by a device user.

determine, for each triggered pixel, a set of one or more neighbor pixels for which light intensity values are to be stored wherein the neighbor pixels comprise those pixels that physically abut each triggered pixel on the focal plane array wherein the set of neighbor pixels includes a first set of pixels that physically abut the triggered pixels, as well as a second set of pixels that physically abut the first set of pixels wherein at least one portion of additional information is stored in the buffer in order to determine neighbor pixels for at least one corner triggered pixel a buffer that temporarily stores light intensity values for at least one previously processed row of pixels, such that when a triggered pixel is identified in a current row, light intensity values for the neighbor pixels in the previously processed row and for the triggered pixel are persistently stored further comprising persistently storing each triggered and neighbor pixels' location on the focal plane array, in addition to the pixels' light intensity value further comprising an act of tagging each triggered pixel, the tag indicating that the pixel's location and light intensity value are to be persistently stored, and further indicating that one or more pixels in the previously scanned-row are to be tagged as neighbor pixels wherein upon determining that two or more adjacent pixels have been tagged as triggered pixels, neighbor pixels are determined to be those pixels that physically abut the triggered pixels, but do not include triggered pixels wherein the focal plane array comprises a plurality of photoelectric image sensors wherein each photoelectric image sensor of the focal plane array comprising a plurality of photoelectric image sensors is scanned right-to-left, top-to-bottom, while scan output values are output in a specific, predefined order to determine neighbor pixels across image sensor boundaries a data transmitter that transmits the persistently stored light intensity values for the triggered and neighbor pixels to a data receiver In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for efficiently collecting and transmitting focal plane array data. The method 200 will now be described with frequent reference to the components and data of environment 100.

Method 200 includes receiving data representing light intensity values from a plurality of pixels in a focal plane array, wherein the data is received in a sequential fashion as the focal plane array pixels are scanned (210). For example, Method 200 includes analyzing the received data to determine which light values correspond to triggered pixels, wherein triggered pixels comprise those pixels that meet a predefined set of criteria (220). For example, Method 200 includes determining, for each triggered pixel, a set of one or more neighbor pixels for which light intensity values are to be stored (230). For example, wherein the neighbor pixels include the following: the pixel scanned immediately before the triggered pixel, the pixel scanned immediately after the triggered pixel, an equivalent timeslot of scanned pixels for the previously processed row of pixels, relative to the triggered pixel and its immediately preceding and immediately following pixels, and an equivalent timeslot of scanned pixels for an immediately subsequent processed row of pixels, relative to the triggered pixel and its immediately preceding and immediately following pixels Method 200 includes temporarily storing light intensity values for at least one previously processed row of pixels, such that when a triggered pixel is identified in a current row, light intensity values for the neighbor pixels in the previously processed row and for the triggered pixel are persistently stored (240). For example, wherein a data storage manager limits which neighbor pixels are to be persistently stored based on available bandwidth and available system memory wherein pixel data is stored in a first-in, first-out (FIFO) queue wherein the FIFO queue allows both implementation of multiple processors running at different clock speeds and storage of multiple triggers per scan Method 200 includes transmitting the persistently stored light intensity values for the triggered and neighbor pixels to a data receiver (250). For example, Accordingly, methods, systems and computer program products are provided which. Moreover, methods, systems and computer program products are provided which.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. An electronic device, comprising:
   an interface configured to receive data representing light intensity values from a plurality of pixels in a focal plane array;
   a processor configured to perform the following:
      analyze the received data to determine which light values correspond to triggered pixels, wherein triggered pixels comprise those pixels that meet a predefined set of criteria; and
      determine, for each triggered pixel, a set of one or more neighbor pixels for which light intensity values are to be stored;
   a buffer that temporarily stores light intensity values for at least one previously processed row of pixels, such that when a triggered pixel is identified in a current row, light intensity values for the neighbor pixels in the previously processed row and for the triggered pixel are persistently stored;
   a memory that persistently stores light intensity values for pixels identified as triggered or neighbor pixels; and
   a data transmitter that transmits the persistently stored light intensity values for the triggered and neighbor pixels to a data receiver.

2. The electronic device of claim 1, wherein the pixels in the focal plane array are arranged in at least one of the following manners: as a one-dimensional array of pixels, as a two-dimensional array of pixels and as a three-dimensional array of pixels.

3. The electronic device of claim 1, wherein the neighbor pixels comprise those pixels that physically abut each triggered pixel on the focal plane array.

4. The electronic device of claim 1, wherein the predefined set of criteria comprises a threshold light intensity value, such that when the threshold light intensity value is reached, the criteria are met.

5. The electronic device of claim 1, wherein the predefined set of criteria comprises a threshold amount of change in light intensity value, such that when the threshold amount of change in light intensity value is reached, the criteria are met.

6. The electronic device of claim 1, further comprising persistently storing each triggered and neighbor pixels' location on the focal plane array, in addition to the pixels' light intensity value.

7. The electronic device of claim 6, further comprising an act of tagging each triggered pixel, the tag indicating that the pixel's location and light intensity value are to be persistently stored, and further indicating that one or more pixels in the previously scanned-row are to be tagged as neighbor pixels.

8. The electronic device of claim 7, wherein upon determining that two or more adjacent pixels have been tagged as triggered pixels, neighbor pixels are determined to be those pixels that physically abut the triggered pixels, but do not include triggered pixels.

9. The electronic device of claim 1, wherein the set of neighbor pixels includes a first set of pixels that physically abut the triggered pixels, as well as a second set of pixels that physically abut the first set of pixels.

10. The electronic device of claim 1, wherein the focal plane array comprises a plurality of photoelectric image sensors.

11. The electronic device of claim 10, wherein each photoelectric image sensor of the focal plane array comprising a plurality of photoelectric image sensors is scanned right-to-left, top-to-bottom, while scan output values are output in a specific, predefined order to determine neighbor pixels across image sensor boundaries.

12. The electronic device of claim 1, wherein the focal plane array is a component part of the electronic device.

13. At an electronic device including at least one processor and a memory, a method for efficiently collecting and transmitting focal plane array data, the method comprising:
   receiving data representing light intensity values from a plurality of pixels in a focal plane array, wherein the data is received in a sequential fashion as the focal plane array pixels are scanned;
   analyzing the received data to determine which light values correspond to triggered pixels, wherein triggered pixels comprise those pixels that meet a predefined set of criteria;
   determining, for each triggered pixel, a set of one or more neighbor pixels for which light intensity values are to be stored;
   temporarily storing light intensity values for at least one previously processed row of pixels, such that when a triggered pixel is identified in a current row, light intensity values for the neighbor pixels in the previously processed row and for the triggered pixel are persistently stored; and
   transmitting the persistently stored light intensity values for the triggered and neighbor pixels to a data receiver.

14. The method of claim 13, wherein the neighbor pixels include the following: the pixel scanned immediately before the triggered pixel, the pixel scanned immediately after the triggered pixel, an equivalent timeslot of scanned pixels for the previously processed row of pixels, relative to the triggered pixel and its immediately preceding and immediately following pixels, and an equivalent timeslot of scanned pixels for an immediately subsequent processed row of pixels, relative to the triggered pixel and its immediately preceding and immediately following pixels.

15. The method of claim 13, wherein a data storage manager limits which neighbor pixels are to be persistently stored based on available bandwidth and available system memory.

16. The method of claim 13, wherein pixel data is stored in a first-in, first-out (FIFO) queue.

17. The method of claim 16, wherein the FIFO queue allows both implementation of multiple processors running at different clock speeds and storage of multiple triggers per scan.

18. A computing system, comprising the following:
   computer system memory configured to receive data representing light intensity values from a plurality of pixels in a focal plane array, wherein the data is received in a sequential fashion as the focal plane array pixels are scanned;
   a processor configured to perform the following:
      obtain the received data over a hardware connection from the memory and analyze the received data to determine which light values correspond to triggered pixels, wherein triggered pixels comprise those pixels that have at least a threshold light intensity value; and
      determine, for each triggered pixel, a set of one or more neighbor pixels for which light intensity values are to be stored, the neighbor pixels comprising those pixels that physically abut each triggered pixel on the focal plane array;

a buffer, connected by a hardware connection to the processor, that temporarily stores light intensity values for at least one previously processed row of pixels, such that when a triggered pixel is identified, light intensity values for the neighbor pixels in the previously processed row and for the triggered pixel are persistently stored;

a data storage manager that limits which neighbor pixels are to be persistently stored based on available bandwidth and available system memory; and a data transmitter that transmits the persistently stored light intensity values to a data receiver.

19. The computing system of claim 18, wherein the pixels in the focal plane array are arranged in at least one of the following manners: as a one-dimensional array of pixels, as a two-dimensional array of pixels and as a three-dimensional array of pixels.

20. The computing system of claim 19, wherein the focal plane array comprises a plurality of photoelectric image sensors, each photoelectric image sensor being scanned right-to-left, top-to-bottom, each scan output value being output in a specific, predefined order to determine neighbor pixels across image sensor boundaries.

* * * * *